(12) United States Patent
Krajcovic et al.

(10) Patent No.: US 7,814,348 B2
(45) Date of Patent: Oct. 12, 2010

(54) POWER MANAGEMENT APPARATUS

(75) Inventors: Jason B. Krajcovic, Ann Arbor, MI (US); Timothy LaBreche, Ann Arbor, MI (US); Aaron Crumm, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 702 days.

(21) Appl. No.: 11/739,742

(22) Filed: Apr. 25, 2007

(65) Prior Publication Data

US 2007/0257654 A1 Nov. 8, 2007

Related U.S. Application Data

(60) Provisional application No. 60/795,006, filed on Apr. 26, 2006.

(51) Int. Cl.
*G06F 1/26* (2006.01)

(52) U.S. Cl. .......... 713/300; 713/310; 713/320; 713/321; 713/322; 713/323; 713/324; 713/330; 713/340; 307/38; 307/39; 700/295; 323/297

(58) Field of Classification Search .......... 713/300, 713/310, 320–324, 330, 340; 307/38, 39; 700/295; 323/297
See application file for complete search history.

(56) References Cited

U.S. PATENT DOCUMENTS

| 5,986,437 | A | 11/1999 | Lee |
| 6,137,280 | A | 10/2000 | Ackermann et al. |
| 6,530,026 | B1 | 3/2003 | Bard |
| 6,831,848 | B2 | 12/2004 | Lanni |

*Primary Examiner*—Abdelmoniem Elamin
(74) *Attorney, Agent, or Firm*—Robert J. Svoboda

(57) ABSTRACT

In one aspect, there is disclosed a power management device that includes a housing, at least one input port, and at least one output port. Also included is a CPU and a user interface. Electrical circuitry connects the ports, CPU and user interface. The CPU includes a real-time operating system and programs actively controlling a power usage.

19 Claims, 4 Drawing Sheets

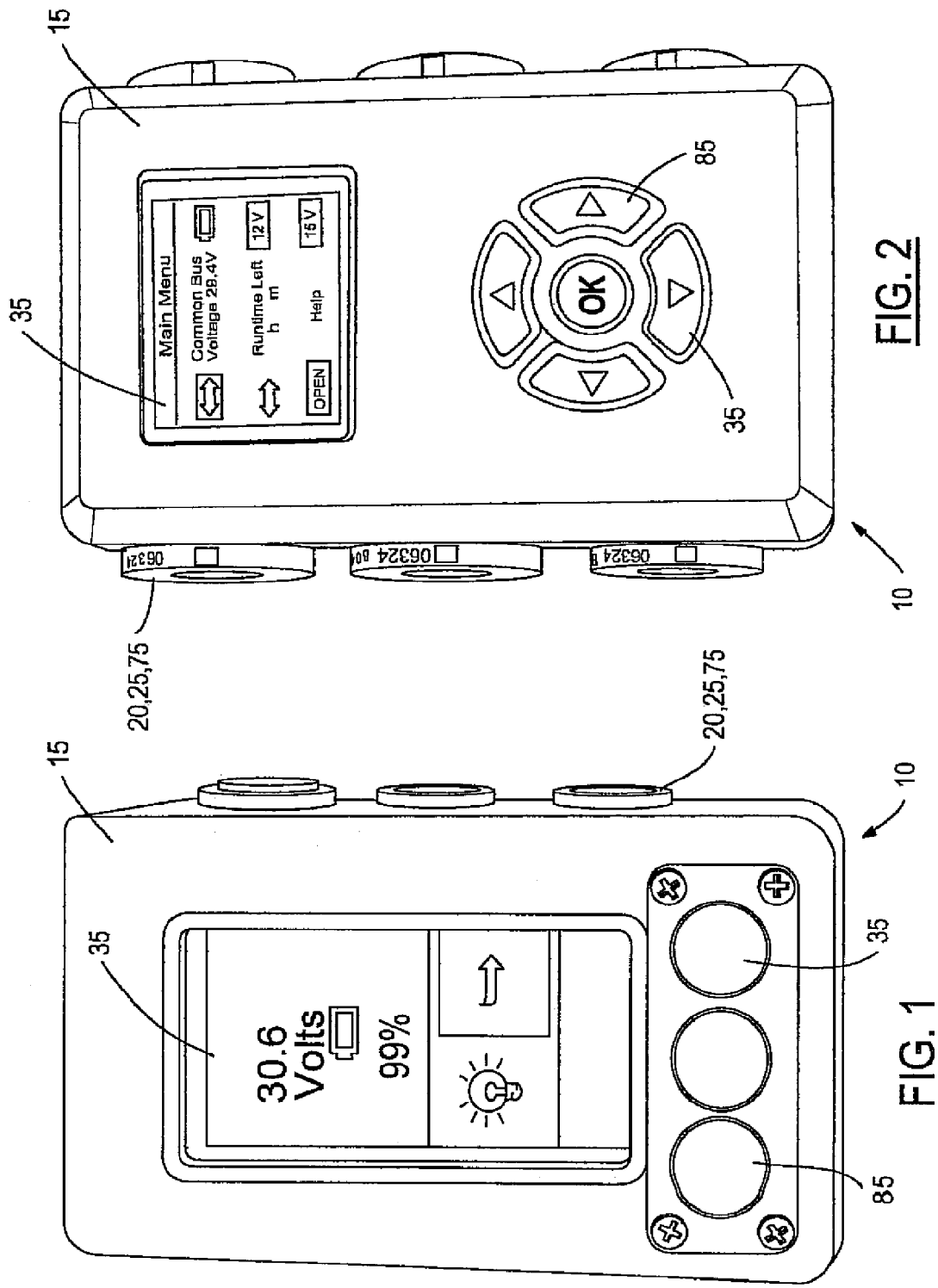

POWER MANAGEMENT APPARATUS

CROSS-REFERENCE TO RELATED APPLICATIONS

This application claims priority of U.S. Provisional Patent Application Ser. No. 60/795,006 filed Apr. 26, 2006, which is incorporated herein by reference.

GOVERNMENT INTERESTS

This invention was made with government support under contract number FA865006C2664, awarded by the Department of Defense. The government has certain rights in this invention.

FIELD OF THE INVENTION

The invention relates to power management apparatus.

BACKGROUND OF THE INVENTION

Power conversion devices are known in the art. Examples of such power converting devices include devices having a multitude of adapters or couplings that provide a specific power or current to a device having a specific power port orientation. Such devices may take an available power source such as a household 110 volt source and convert that source for use by various devices which require differing voltages or power requirements. These types of devices are limited in that they require a large number of differing adapters or connectors to mate with differing devices. Additionally, such devices only convert to a specific level dictated by the configuration of the adapter. There is therefore a need in the art for a device that allows for adjusting the conversion to various values.

Additionally, prior art devices for providing a control or regulation of power devices may include a simple control loop in a microcontroller in which the software acts as a simple loop. The loop may call different subroutines each of which manages a portion of the hardware or software of the device. Such simple control loops do not provide the ability for advanced control functions such as the prioritization and regulation of various devices that may be coupled to the management device. There is therefore a need in the art for an improved power management device that has an advanced capability and includes an operating system and programs that actively control a power usage.

SUMMARY OF THE INVENTION

In one aspect, there is disclosed a power management device that includes a housing, at least one input port, and at least one output port. Also included is a CPU and a user interface. Electrical circuitry connects the ports, CPU and user interface. The CPU includes a real-time operating system and programs actively controlling a power usage.

In another aspect, there is disclosed a power management device that includes a housing, at least one input port, and at least one output port. Also included is a CPU and a user interface. Electrical circuitry connects the ports, CPU and user interface. The power management device automatically adjusts to accept power from one or more sources in a manner appropriate for that source and supplies power to a load in a manner appropriate for the load.

In another aspect, there is disclosed a power management device that includes a housing, at least one input port, and at least one output port. Also included is a CPU and a user interface. Electrical circuitry connects the ports, CPU and user interface. The CPU includes programs automatically prioritizing the power characteristics of devices connected to the input and output ports.

BRIEF DESCRIPTION OF THE DRAWINGS

FIG. 1 is a front view of one embodiment of a power management device;

FIG. 2 is a front view of another embodiment of a power management device;

DETAILED DESCRIPTION OF THE EMBODIMENTS

Figure 3:
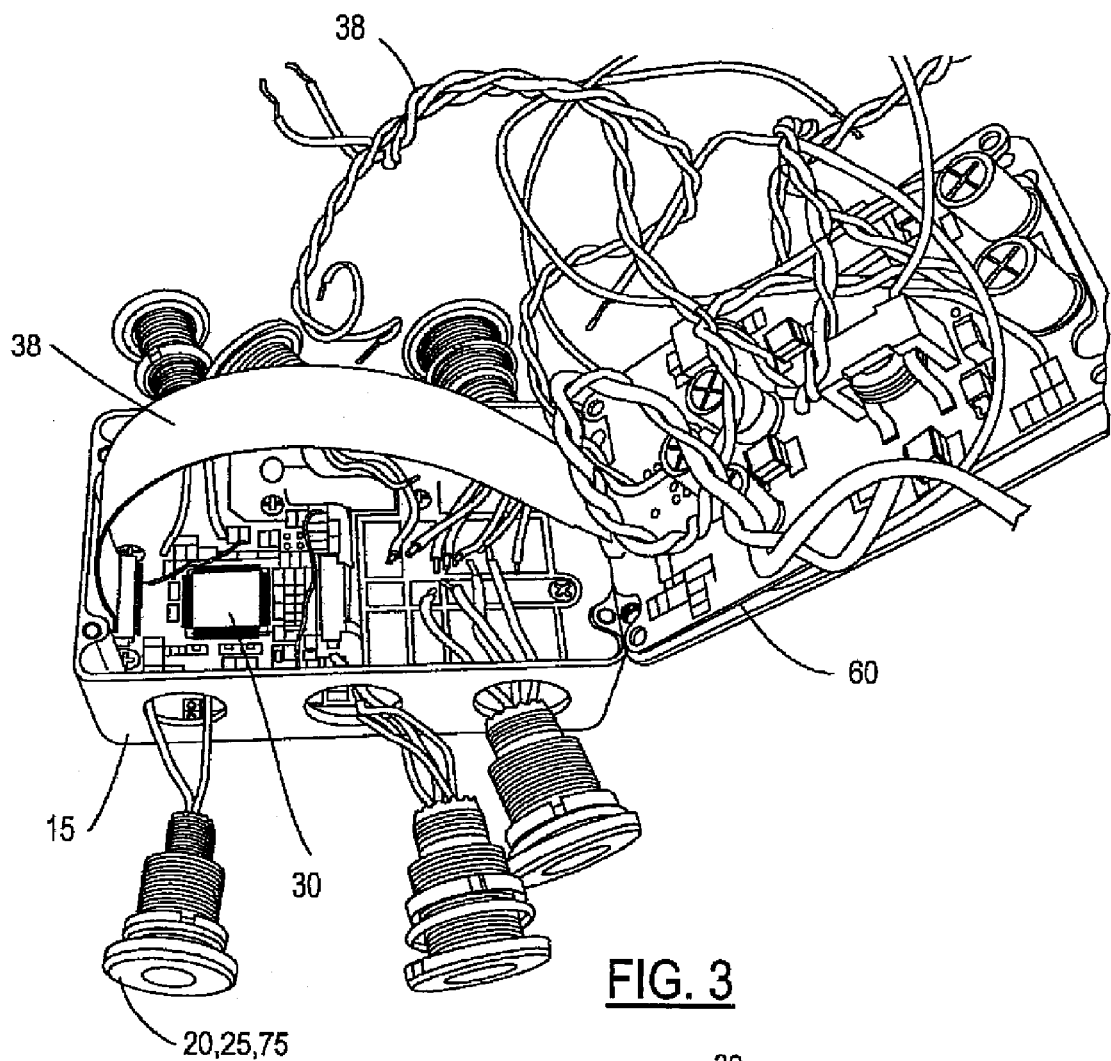
FIG. 3 is an isometric view detailing the various components of a power management device.

Referring to FIGS. 1, 2 and 3, there are shown various embodiments of a power management device 10. The power management device 10 includes a housing 15, and at least one input port 20, and at least one output port 25. The power management device 10 also includes a central processing unit (CPU) 30 and a user interface 35. Electrical circuitry 38 connects the input and output ports 20, 25, CPU 30 and user interface 35. The CPU 30 includes a real-time operating system 40 and programs 45 actively controlling a power usage.

Figure 4:
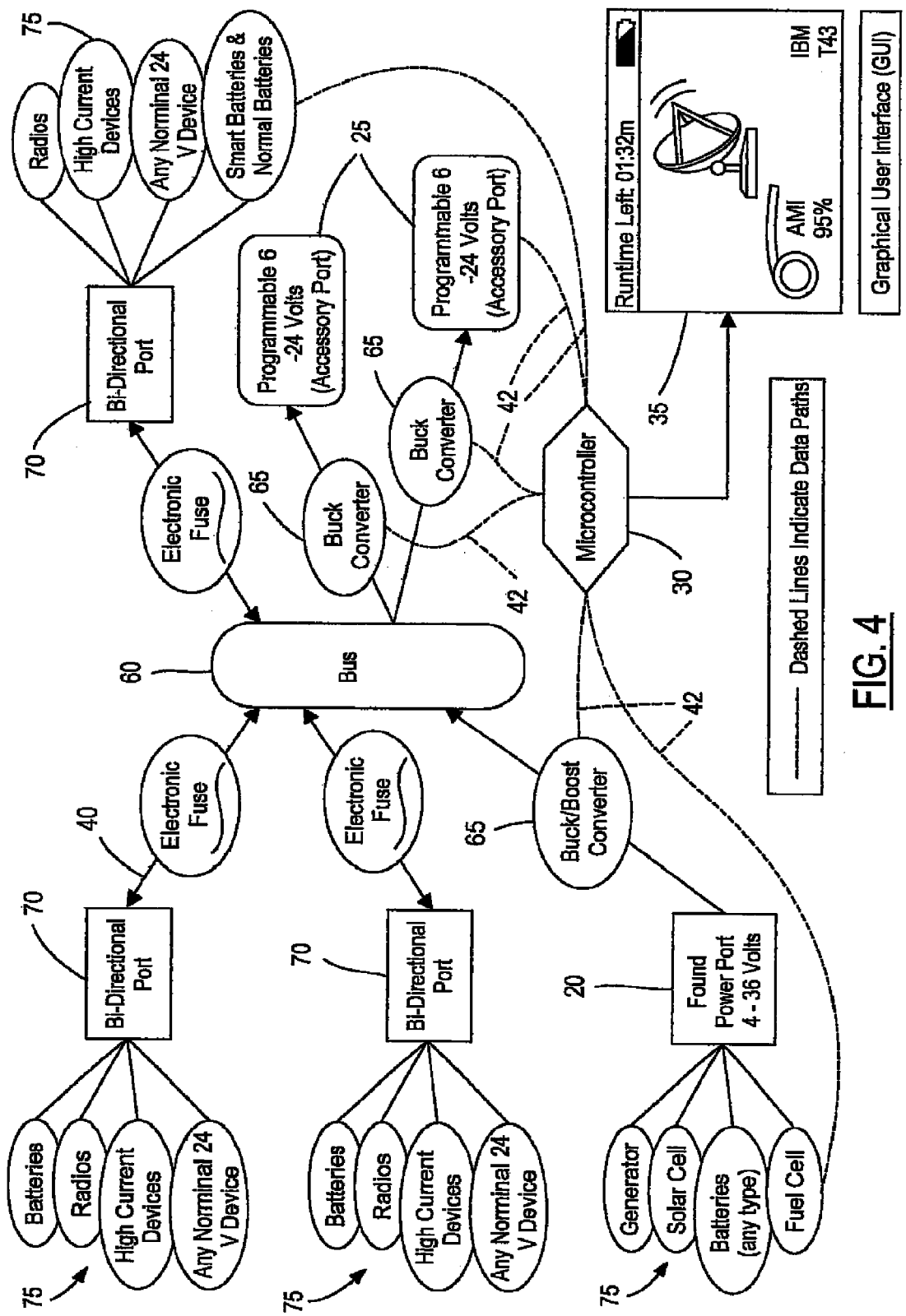
FIG. 4 is a schematic representation of one embodiment of a power management device including the pathways for power transmission and data or communication paths.

In one aspect, and as shown in the figures, the power management device 10 includes a plurality of input and output ports 20, 25. The various ports depicted in the figures may be one way for use both as an input or as an output or may be bidirectional allowing passage of an electrical current in either direction. The at least one input port 20 is adapted to connect to a power source 50. Various power sources or connected devices may include AC power sources, various batteries, fuel cells, solar cells, engine-driven generators or other power sources. The at least one input port 20 may be connected to a buck-boost device 55 for converting the power source to a desired value. The buck-boost device 55 may be coupled to a bus member 60, as best shown in FIG. 4.

The at least one output port 25 is adapted to connect to a power consuming device. The at least one output port 25 may be connected to a buck converter 65 to allow for various output voltages to any of a number of connected devices.

Various of the ports may be bidirectional ports, as described above. The bidirectional ports 70 allow for transmission of a power from a device connected to the bidirectional port 70 to the bus member 60. Additionally, the bidirectional port 70 may act as an output wherein a device requiring a current is coupled to the bus member 60. In one aspect, and as shown in FIG. 4, the electrical circuitry 38 includes communication paths 42 for linking any of the input or output ports 20, 25, CPU 30, user interface 35 and devices 75 that are connected to the ports. As shown in FIG. 4 by the dashed lines, any of the devices 75 connected to the various ports may be linked via data paths 42 to the CPU 30 to allow for the adjustment of various parameters, as will be described in more detail below. While in the depicted embodiment data paths 42 exist only for a portion of the ports, it should be realized that data paths 42 on any or all of the devices connected through the various ports may be included. Additionally, the data paths 42 may connect the various hardware components including the buck-boost 55 and buck converters 65 to the CPU 30 to provide for control of the various power levels and currents provided to the system bus 60.

As stated above, the power management device 10 includes a user interface 35. The user interface 35 may be selected from various types of interfaces including aural, tactile or optical interfaces. For example, voice-activated or touch screens as well as various displays or lights may be used. Additionally, any remote interface may also be utilized. In one aspect, the user interface is a graphical user interface. The graphical user interface may be operated by programs 45 associated with the real-time operating system 40 of the CPU 30 and include a library driven menu. Additionally, the user interface 35 may include a toggle 85 or input member that may be utilized to adjust a set of desired parameters. In the depicted embodiments shown in FIGS. 1 and 2, it can be seen that the toggle 85 may be in various forms. As shown in FIG. 1, the toggle 85 may include four arrow keys allowing movement of a cursor and a central select or enter button. The embodiment disclosed in FIG. 2 shows a set of three buttons to allow a user to select and adjust any of the various parameters. It should be realized that any user interface device such as touch screens, touch pads, buttons or various other toggles 85 outlined above may be utilized by the power management device 10.

Figure 6:
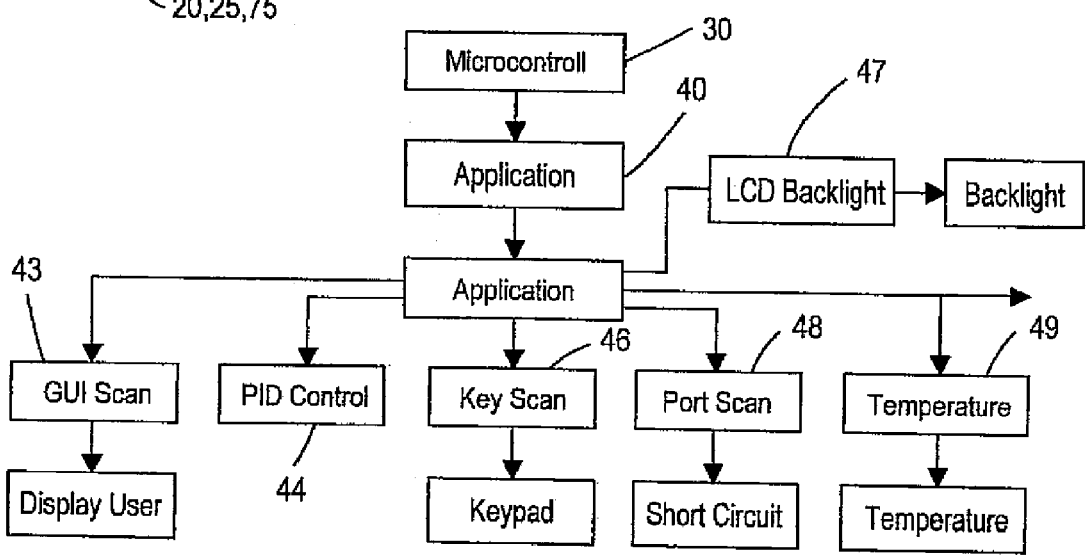
FIG. 6 is a flow diagram detailing the real-time operating system structure of one embodiment of a power management device.

As outlined above, the power management device 10 includes a CPU 30 having a real-time operating system 40 and programs 45 actively controlling a power usage. Referring to FIG. 6, there is shown a schematic representation of one embodiment of a real-time operating system 40 and programs 45 associated with the CPU. As can be seen in the figure, the CPU includes a real-time operating system platform. The real-time operating system is a multitasking operating system intended for real-time applications. A real-time operating system utilizes specialized scheduling algorithms to provide the system to switch between various pieces of code or between tasks based on a timer or priority event. Such an operating system introduces the possibility of managing multiple tasks running at the same time. One such real-time operating system includes a preemptive multitasking system such that any piece of task code is separated from another piece of task code to prevent damage of the data of one task from the task code of another. Access to the shared data can be controlled utilizing a synchronization strategy such as message queues, semaphores, or nonblocking synchronization schemes. In another aspect, a real-time operating system 40 including microkernels and exokernels may be utilized. A microkernel is an arrangement that allows the operating system kernel to allocate memory and switch the CPU to different threads of execution. The use of a real-time operating system 40 allows for the power management device 10 to be easily configured and adjusted for a desired use. For example, the programs 45 associated with the real-time operating system 40 may be modified or reprogrammed for various tasks.

As shown in FIG. 6, the real-time operating system 40 includes programs 45 or applications for various functions. For example, as shown in FIG. 6, one program 45 may include a graphical user interface scan 43 that has a subroutine for the display. Additionally, another program for the PID control of the DC converters 44 may be utilized. Additionally, programs for scanning the keypad 46 or toggle device may be utilized having a subroutine or subprogram for activating the keypad. Additionally, other programs 45 program for the LCD backlighting 47, scanning the ports 48 and detecting short circuits as well as detecting a temperature 49 at various sensors may also be included. It should be realized that the schematic represented in FIG. 6 represents only a portion of any number of programs 45 that may be included with the real-time operating system 40.

As stated above, the power management device 10 automatically identifies devices 75 that are connected to the ports and automatically adjusts one or more parameters appropriate for the connected device 75. In this manner, various devices 75 may be connected to the power management device 10 wherein the power management device automatically determines the type of device 75 connected and provides a necessary power to that device 75. Additionally, the power management device through the use of the real-time operating system 40 and programs 45 can allow a user to select from a desired energy management mode. The energy management modes may be stored in the memory of the CPU or may be custom tailored by a user for customizing devices 75 that may be connected to the power management device 10.

In one aspect, the programs 45 automatically prioritize the power characteristics of devices 75 that are connected to the power management device 10. The programs 45 running on the real-time operating system 40 may also calculate and display a time remaining for the power available based on the prioritized use of the devices 75 that are connected to the power management device 10.

Figure 7:
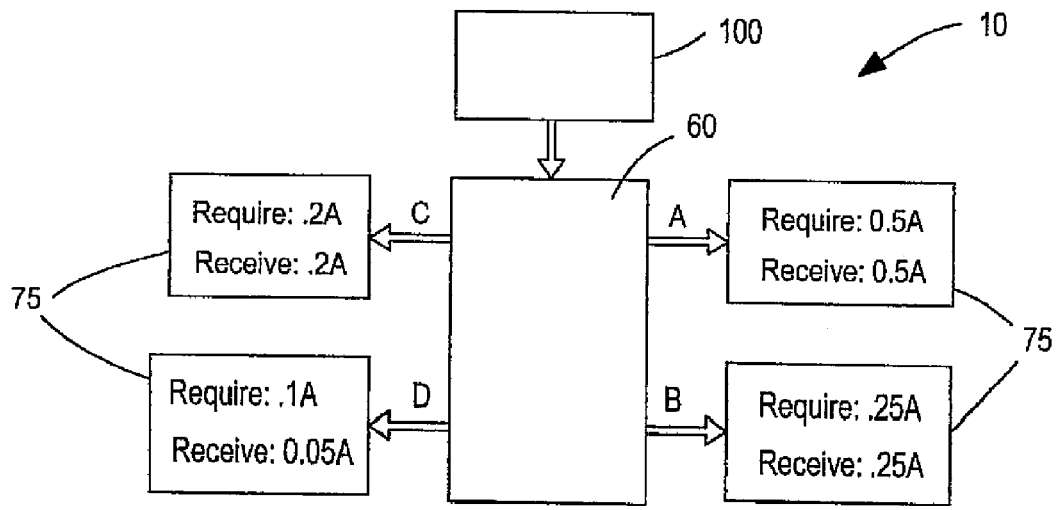
FIG. 7 is a schematic representation of a prioritization of various devices connected to a power management device.

Referring to FIG. 7, there is shown a schematic representation of a power management device 10 with various connected devices 75 having different priorities. In the present depicted example, there is an energy source or battery 100 having a limited amount of energy connected to the system bus 60. A user has inputted that he wants the battery to last a specific number of hours. For the sake of example, the battery may have a 4 amp hour life and is only 75% at capacity. The user has entered a specific time to last of 3 hours. Therefore, the output of the battery is limited by the programs 45 to 1 amp hour. As can be seen by the various priorities ranging from A to D, various devices 75 connected to a port require differing amounts of current. For example, the port labeled A may need 0.5 amps from the system bus 60 and as it is rated the highest priority it will receive 0.5 amps from the system bus 60. Similarly, the next highest priority B may require 0.25 amps from the system bus 60 and it also receives 0.25 amps from the bus 60. Similarly the next highest rated priority C may require 0.2 amps from the system bus 60 and receives 0.2 amps from the system bus 60. However, the lowest priority port, port D, may require 0.1 amps from the system bus 60, but as there is only 0.05 amps remaining from the limited output of 1 amp, port D would only receive 0.05 amps. In this example, the assumption was made that the user entered an amount of time that he wanted the energy or battery to last. It should be realized that various other parameters may be adjusted or prioritized by the programs. For example, various devices connected to the power management device can be regulated to limit the current they receive based on any number of adjustable parameters. For example, various ports can have the same priority or differing priorities. Additionally, each priority can be assigned by programs 45 associated with the real-time operating system 40 or may be directly inputted by a user of the power management device 10. Additionally, the power management device 10 may determine mutually exclusive activities of the connected devices 75 and adjust a power or current to at least one of the devices 75. In this manner, devices that may not be operable at the same time are regulated by the power management device 10 to prevent current from being delivered to one or more of the devices 75 to preserve an amount of power of a storage device coupled to the power management device 10 through one of the ports.

As stated above, various power or energy management modes can be provided by the programs 45 or be entered by a user through the user input interface 35. Examples of various energy modes include a high energy conservation mode that would limit power or current being transmitted to only the highest priority devices. Additionally various other levels including medium, low or no energy conservation modes may be utilized to adjust the prioritization scheme and energy allocation to the various connected devices 75. Additionally, it should be realized that various connected devices 75 may be specified as always receiving current or power. The use of a real time operating system 40 and programs 45 allows for easily tailoring and adjusting the various parameters of the power management device 10 and connected devices 75 to achieve a specific mission or task.

Figure 5:
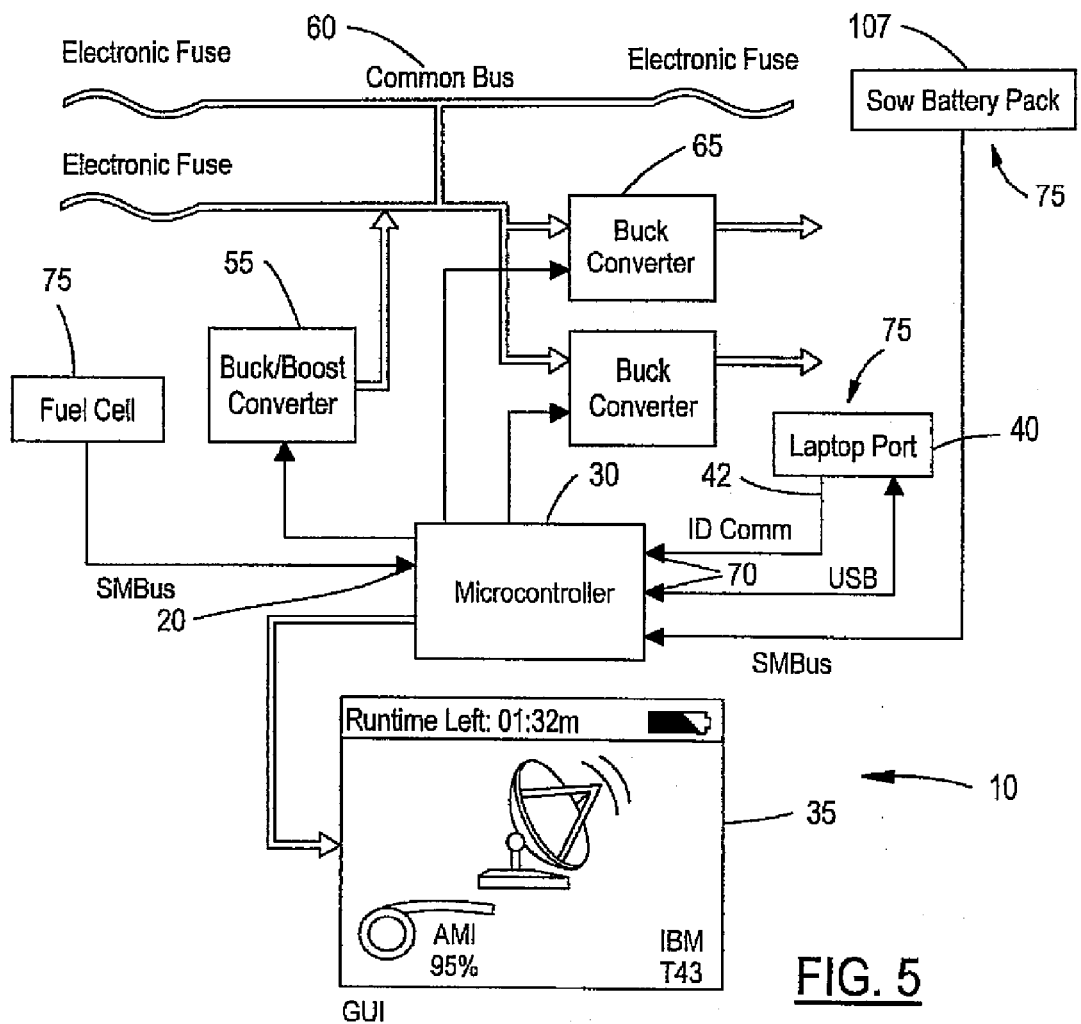
FIG. 5 is a schematic representation of another embodiment of a power management device including the various communication and power transmission paths as well as various devices connected to the power management device.

Referring to FIG. 5 there is shown one embodiment of a power management device 10 having various devices 75 connected to the ports. As can be seen in the figure, a fuel cell 105 is attached to an input port 20 and provides a source of power to the power management device 10. The power may be regulated by the buck boost device 55 and routed to the system bus 60. The current from the system bus 60 may be regulated by a buck converter 65 to provide a desired power to any device 75 connected to the output ports 25. Additionally, a SOW or smart battery 107 may be connected to a bidirectional port 70 to receive and store power from the fuel cell 105 or it may deliver power to the system bus 60 when directed by the power management device 10. A lap top 110 may be connected to the power management device 10 at a bidirectional port 70 and receive a desired power from the bus 60. Additionally the lap top may communicate with the CPU 30 via a data path 42. The data path 42 may be wired, wireless, optical infrared or any other data transmission protocol. The power management device 10 may display various parameters on the user interface 35. It should be realized that various other devices 75 may be connected to the power management device. Any device 75 requiring a power of from 4 to 30 volts may be connected to the power management device and any power sources or storage devices as previously described above may also be connected to the power management device. 10

The invention has been described in an illustrative manner. It is to be understood that the terminology which has been used is intended to be in the nature of words of description rather than limitation. Many modifications and variations of the invention are possible in light of the above teachings. Therefore, within the scope of appended claims, the invention may be practiced other than specifically described.

The invention claimed is:

1. A power management device comprising:
   a housing; at least one input port, said input port being configured to connect to a first device such that the input port is configured to automatically detect a power attribute being provided from the first device to the power management device;
   at least one output port, said output port being configured to connect to a second device such that the output port is configured to automatically detect a desired power attribute of the second device;
   a CPU;
   a user interface; and
   electrical circuitry connecting the ports, CPU and user interface;
   wherein the CPU includes a real-time operating system and programs actively controlling a power transfer between the first device and the second device.

2. The power management device of claim 1 including a plurality of input and output ports, wherein the CPU includes a real-time operating system actively controlling power transfer between a plurality of devices connected to the plurality of ports.

3. The power management device of claim 1 including at least one bidirectional port.

4. The power management device of claim 1 wherein the user interface is selected from aural, tactile or optical interfaces.

5. The power management device of claim 4 wherein the user interface is a graphical user interface.

6. The power management device of claim 5 wherein the programs include a library driven menu for the graphical user interface.

7. The power management device of claim 1 wherein the user interface includes a display for viewing and adjusting a set of parameters.

8. The power management device of claim 1 wherein the power management device automatically identifies devices connected to the ports and automatically adjusts one or more parameters appropriate for the connected device.

9. The power management device of claim 8 wherein the connected first device may be selected from:
   AC power sources, batteries, fuel cells, solar cells, engine driven generators or other power sources.

10. The power management device of claim 1 wherein the electrical circuitry includes a DC to DC converter for adjusting a current between the ports.

11. The power management device of claim 1 wherein the electrical circuitry includes communication paths for linking any of the ports, CPU, user interface and devices connected to the ports.

12. The power management device of claim 1 wherein a user may select from a desired energy management mode.

13. The power management device of claim 1 wherein the programs automatically prioritize the power characteristics of devices connected to the power management device.

14. The power management device of claim 13 wherein the programs calculate and display a time remaining for the power available based on the prioritized use of the devices connected to the power management device.

15. The power management device of claim 13 wherein the power management device determines mutually exclusive activities of the connected devices and adjusts a power to at least one of the devices.

16. The power management device of claim 1 wherein the programs may be modified or reprogrammed for various tasks.

17. The power management device of claim 1, wherein the power management device is configured to automatically detect a voltage level being provided from the first device to the power management device, and wherein the power management device is configured to automatically detect a desired voltage level of the second device.

18. The power management device of claim 1, wherein the power management device is configured to automatically detect a current level being provided from the first device to the power management device, and wherein the power management device is configured to automatically detect a desired current level of the second device.

19. The power management device of claim 1, wherein the power management device is configured to automatically detect a power level being provided from the first device to the power management device, and wherein the power management device is configured to automatically detect a desired power level of the second device.

* * * * *